(12) United States Patent
Ellis et al.

(10) Patent No.: US 9,051,444 B2
(45) Date of Patent: Jun. 9, 2015

(54) PROCESS FOR MANUFACTURING COMPOSITE MATERIALS

(75) Inventors: John Ellis, Duxford (GB); Emille Fisset, Enfield (GB); David Tilbrook, Saffron Walden (GB); Paul Mackenzie, Purley (GB); Isabelle Blanc, Bron (FR); Lucien Fiore, Lyons (FR); Bernadette Tizon, Le Clos de Retz (FR)

(73) Assignees: Hexcel Composites Limited, Cambridge (GB); Hexcel Composites, S.A.S., Dagneux (FR)

( * ) Notice: Subject to any disclaimer, the term of this patent is extended or adjusted under 35 U.S.C. 154(b) by 284 days.

(21) Appl. No.: 13/379,026

(22) PCT Filed: Jun. 25, 2010

(86) PCT No.: PCT/GB2010/051052
§ 371 (c)(1),
(2), (4) Date: Dec. 18, 2011

(87) PCT Pub. No.: WO2010/150022
PCT Pub. Date: Dec. 29, 2010

(65) Prior Publication Data
US 2012/0100362 A1   Apr. 26, 2012

(30) Foreign Application Priority Data
Jun. 26, 2009 (GB) .................................. 0911036.2

(51) Int. Cl.
*B29C 70/50* (2006.01)
*C08J 5/24* (2006.01)
*B32B 5/26* (2006.01)
*B32B 5/28* (2006.01)
*B32B 27/04* (2006.01)

(52) U.S. Cl.
CPC ... *C08J 5/24* (2013.01); *B32B 5/26* (2013.01); *B32B 5/28* (2013.01); *B32B 27/04* (2013.01)

(58) Field of Classification Search
CPC ...... B29C 70/50; B29C 70/504; B29C 70/506
USPC .............. 156/166, 176, 178, 179, 309.6, 312, 156/322
See application file for complete search history.

(56) References Cited

U.S. PATENT DOCUMENTS 4,804,509 A * 2/1989 Angell et al. ................. 264/136
4,919,739 A   4/1990 Dyksterhouse et al.
(Continued)

FOREIGN PATENT DOCUMENTS

EP   0885704 B1   8/2003
EP   2053078      4/2009
(Continued)

*Primary Examiner* — Scott W Dodds
(74) *Attorney, Agent, or Firm* — W. Mark Bielawski; David J. Oldenkamp

(57) ABSTRACT

A process for the manufacture of a prepreg comprising feeding a layer of unidirectional conductive fibers having a defined width, bringing into contact with a first face of the fibers a first layer of resin comprising thermosetting resin, and compressing the resin and fibers together by passing over one or more impregnation rollers, wherein the pressure exerted onto the conductive fibers and resin does not exceed 40 kg per centimeter of the width of the conductive fibers, and the resin being in sufficient amount for the resin to enter the interstices of the fibers and leave a first outer layer of resin essentially free of unidirectional conductive fibers.

20 Claims, 5 Drawing Sheets

(56) References Cited

U.S. PATENT DOCUMENTS

| | | | |
|---|---|---|---|
| 5,165,976 A * | 11/1992 | Newing et al. | 428/40.9 |
| 5,387,301 A * | 2/1995 | Miyao et al. | 156/179 |
| 5,874,152 A * | 2/1999 | Middelman | 428/105 |
| 5,962,348 A | 10/1999 | Bootle et al. | |
| 6,410,126 B1 | 6/2002 | Guevel et al. | |
| 6,656,302 B2 * | 12/2003 | Kishi et al. | 156/172 |
| 2003/0062118 A1 | 4/2003 | Gerhard et al. | |

FOREIGN PATENT DOCUMENTS

| | | |
|---|---|---|
| GB | 2449146 B | 4/2009 |
| JP | 61-83006 | 4/1986 |
| WO | 93/18910 | 9/1993 |
| WO | 2008/040963 | 4/2008 |
| WO | 2008/056123 | 5/2008 |
| WO | 2010/035021 | 4/2010 |

* cited by examiner

PROCESS FOR MANUFACTURING COMPOSITE MATERIALS

TECHNICAL FIELD

The present invention relates to a process for manufacture of prepregs comprising fibres and resin matrix which when stacked to form a laminate and subsequently cured, form composite materials, particularly with improved resistance to damage caused by lightning strikes.

BACKGROUND

Composite materials have well-documented advantages over traditional construction materials, particularly in providing excellent mechanical properties at very low material densities. As a result, the use of such materials is becoming increasingly widespread and their fields of application range from "industrial" and "sports and leisure" to high performance aerospace components.

Prepregs, comprising a fibre arrangement impregnated with resin such as epoxy resin, are widely used in the generation of such composite materials. Typically a number of plies of such prepregs are "laid-up" as desired and the resulting laminate is cured, typically by exposure to elevated temperatures, to produce a cured composite laminate.

A common composite material is made up from a laminate of a plurality of prepreg fibre layers, e.g. carbon fibres, interleafed with resin layers. Although the carbon fibres have some electrical conductivity, the presence of the interleaf layers means that this is only predominantly exhibited in the composite in the plane of the laminate. The electrical conductivity in the direction orthogonal to the surface of the laminate, the so-called z-direction, is low.

Practitioners in the art have a strong preference for such interleaf laminates having well defined layers of fibre separated by well defined layers of resin to produce a uniform layered laminate. It is believed that such clearly defined layers provide improved mechanical properties, especially toughness e.g. as measured by impact resistance.

The lack of conductivity in the z-direction is generally accepted to contribute to the vulnerability of composite laminates to electromagnetic hazards such as lightning strikes. A lightning strike can cause damage to the composite material which can be quite extensive, and could be catastrophic if occurring on an aircraft structure in flight. This is therefore a particular problem for aerospace structures made from such composite materials.

A wide range of techniques and methods have been suggested in the prior art to provide lightning strike protection to such composite materials, typically involving the addition of conductive elements at the expense of increasing the weight of the composite material.

In WO 2008/056123 improvements have been made in lightning strike resistance, by adding hollow conductive particles in the resin interleaf layers so that they contact the adjacent fibre layers and create an electrical pathway in the z-direction. However this often requires elaborate processing methods and can reduce fatigue properties.

There therefore remains a need in the art for a conductive composite material which is lightweight and has excellent mechanical properties.

SUMMARY OF INVENTION

In a first aspect, the invention relates to a process for the manufacture of a prepreg comprising feeding a layer of unidirectional conductive fibres having a defined width, bringing into contact with a first face of the fibres a first layer of resin comprising thermosetting resin, and compressing the resin and fibres together by passing over one or more impregnation rollers, wherein the pressure exerted onto the conductive fibres and resin does not exceed 40 kg per centimeter of the width of the conductive fibres, and the resin being in sufficient amount for the resin to enter the interstices of the fibres and leave a first outer layer of resin essentially free of unidirectional conductive fibres.

In a second aspect, the invention relates to a prepreg obtainable by the process as described herein.

In another aspect, the invention relates to a process for the manufacture of a prepreg comprising continuously feeding tows of unidirectional conductive fibres, bringing into contact with a face of the fibres a first layer of resin comprising thermosetting resin, and compressing the resin and fibres together through at least one S-wrap stage and sufficient for the resin to enter the interstices of the fibres and leaving a first outer layer of resin.

It should be noted that in specifying any range or amount, any particular upper value can be associated with any particular lower value.

The term "essentially free of unidirectional conductive fibres" can be taken to mean that the resin layer comprises less than 1% by volume of unidirectional conductive fibres. However it is to be noted that other materials may be present in the resin layer, as desired.

Prepregs produced by the invention have been found to have a disrupted fibre layer, such that when a plurality of such prepregs are stacked together, producing a prepreg stack comprising a plurality of structural layers of disrupted conductive fibres separated by resin interleaf layers and then cured to form a cured composite laminate, much greater conductively in the z-direction is obtained whilst retaining excellent toughness properties. Additionally this can be achieved without necessarily incurring any increases in weight.

Known interleaf prepregs are typically produced in a two stage process. The first stage bringing the fibres into contact with resin which enters the interstices, followed by bringing into contact with another resin often comprising particulate material, typically toughener particles. This second stage is intended merely to lay down the resin including particulate material and in so doing produce a uniform thickness layer of resin free of conductive fibres which becomes an interleaf layer when a plurality of such prepregs are stacked together.

The present invention employs a one stage process, producing the disrupted structures desired. This is believed to produce a layer of resin as in the two-stage process, but wherein the thickness is not uniform, and in fact is zero in places, to permit contact between adjacent layers of structure conductive fibres.

It is therefore believed that the improved conductivity is due to a bridging effect caused by points of contact existing between adjacent fibre layers, made possible by their disrupted nature. The degree of disruption is such that the resin interleaf layers are essentially preserved, ensuring that the cured composites produced possess the required toughness. Thus, an intermediate degree of disruptedness is achieved, in order to meet the apparently conflicting requirements of high conductivity and high toughness.

Thus, it has been found that, contrary to the general understanding in the art that uniform layers of fibre should be separated by uniform layers of resin free of fibres, permitting, or even encouraging, disruption of the fibre layers, can provide a conductive composite material with the mechanical performance of a traditional uniform interleaf composite.

The process of the invention is a continuous process involving the passage of many thousands of fibres through a series of stages, typically guided by rollers. The point where the fibres meet the resin, usually in sheet form, is the start of the impregnation stage.

Before the fibres are contacted with the resin and reach the impregnation zone they are typically arranged in a plurality of tows, each tow comprising many thousands of filaments, e.g. 12,000. These tows are mounted on bobbins and are fed initially to a combing unit to ensure even separation of the fibres. It has been found that unusually low fibre tensions just after the bobbin feed position provide further improvements to the disruption of the fibres in the eventual prepreg. Thus, the tension per filament at this position is preferably from 0.007 to 0.025 g, preferably from 0.01 to 0.015 g.

In the process of the invention, preferably a second layer of resin comprising thermosetting resin is brought into contact with the other face of the fibres, typically at the same time as the first layer, compressing the first and second layers of resin such that resin enters the interstices of the fibres. Such a process is considered to be a one-stage process because, although each face of the fibres is contacted with one resin layer, all the resin in the eventual prepreg is impregnated in one stage.

It is understood to be an essential element of the invention that the resin and fibre one-stage impregnation process is carried out gently, without high pressures being applied to the resin and fibres. This is because high pressures tend to induce too high a degree of disruption. Thus, the desired controlled disruption arises by the combination of the one-stage impregnation and the low pressures involved.

Resin impregnation typically involves passing the resin and fibres over rollers, which may be arranged in a variety of ways. Two primary arrangements are the simple "nip" arrangement and the "S-wrap" arrangement.

An S-wrap stage is wherein the resin and fibres, both in sheet form pass around two separated rotating rollers in the shape of the letter "S", known as S-wrap rollers. Alternative roller arrangements include the widely used "nip" wherein the fibre and resin are pinched, or nipped, together as they pass between the pinch point between two adjacent rotating rollers. The pressures induced in the resin and fibres can be controlled by parameters such as separation between rollers, speed, relative speed between rollers and resin and fibres and the contact area of the rollers.

It is understood that S-wrap provides ideal conditions for reliable and reproducible impregnation of the resin between the interstices of the fibres whilst also providing sufficient disruption.

However, nip stages are also possible, provided the pressures are kept low, e.g. by control over the gap between adjacent rollers.

It has been found that although large pressures in theory provide excellent resin impregnation, they can be detrimental to the outcome of the prepreg in the one-stage process according to the invention. It has been found that resin impregnation can be unreliable and fall outside required tolerances.

Thus, the pressure exerted onto the conductive fibres and resin preferably does not exceed 35 kg per centimeter of width of the conductive fibre layer, more preferably does not exceed 30 kg per centimeter.

Following impregnation of resin into the fibres, often there is a cooling stage and further treatment stages such as laminating, slitting and separating.

To facilitate impregnation of the resin into the fibres it is conventional for this to be carried out at an elevated temperature, e.g. from 60 to 150° C. preferably from 100 to 130° C., so that the resin viscosity reduces. This is most conveniently achieved by heating the resin and fibres, before impregnation, to the desired temperature, e.g. by passing them through an infra-red heater. As mentioned above, following impregnation there is typically a cooling step, to reduce the tackiness of the formed prepreg. This cooling step can be used to identify the end of the impregnation stage.

It has also been found that resin with an inherently lower viscosity can provide improved electrical conductivity in the eventual cured composite. Thus, preferably the resin has a viscosity of less than 300 Pas at a temperature of 70° C., more preferably from 100 to 250 Pas, as measured between 25 mm parallel plates with a gap of 500 μm with a sample volume of 0.25 ml and an oscillation with an angular frequency of 10 rad/s, e.g. as carried out on a TA AR-2000.

Rollers from 200 to 400 mm in diameter, more preferably from 220 to 350 mm, most preferably from 240 to 300 mm, have been found to provide the right conditions for achieving the desired disrupted fibre structures.

For example, when in S-wrap arrangement, two rollers are preferably spaced apart to provide a gap between the centres of them of from 250 to 500 mm, preferably from 280 to 360 mm, most preferably from 300 to 340 mm, e.g. 320 mm.

Two adjacent pairs of S-wrap rollers are preferably separated between the centres of respective rollers of from 200 to 1200 mm, preferably from 300 to 900 mm, most preferably from 700 to 900 mm, e.g. 800 mm.

The impregnation rollers may rotate in a variety of ways. They may be freely rotating or driven. If driven, they are conventionally driven so that there is no difference between the speed of rotation and the speed of passage of the resin and fibres over the rollers. Sometimes it may be desirable to apply a slight increased speed or decreased speed relative to the passage of resin and fibres. Such a difference is referred to in the art as "trim".

It has been surprisingly found that a more effective controlled disruption can be achieved with a net positive trim. It is not generally possible to apply a positive trim to all the impregnation rollers, and so generally some are given a negative trim whilst maintaining an overall net positive trim. A net positive trim of less than 5%, preferably less than 3%, has been found to give good results. For example, trims of −2%/0%/+2%/+1% for four sets of impregnation rollers gives a net positive trim of 0.25%.

The impregnation rollers may be made from a wide variety of materials, although they typically have a metal exterior. Chrome finished rollers have been found to be preferable.

In order to improve handling of the resin it is conventional that it is supported onto a backing material, such as paper. The resin is then fed, typically from a roll, such that it comes into contact with the fibres, the backing material remaining in place on the exterior of the resin and fibre contact region. During the subsequent impregnation process the backing material provides a useful exterior material to apply pressure to, in order to achieve even impregnation of resin.

It has been found that when the backing material is compressible the forces produced by the impregnation process on the fibre layer are reduced. This is believed to be because compressible paper will become initially compressed during impregnation and only then will the forces from the impregnation process be transferred to the fibres. Thus, non-compressible paper is preferred because it increases the forces acting on the resin and fibres during impregnation, thus creating greater disruption of the fibres and better impregnation of the resin. A suitable measure of compressibility is the ratio of the thickness of the paper to its material density, called the compressibility ratio. It has been found that backing paper with a compressibility ratio of less than $0.001$ $kg^{-1}m^{-2}$ are preferred.

For example, a glassine-based calendared or super-calendared differential silicone coated release paper that has a compressibility factor 0.00083 works well compared to another paper that is not calendared or super-calendared with a compressibility factor of 0.00127. Glassine based super-calendared papers are commercially available from many sources such as Mondi and Laufenberg.

The resin comprises a thermosetting resin and may be selected from those conventionally known in the art, such as resins of phenol formaldehyde, urea-formaldehyde, 1,3,5-triazine-2,4,6-triamine (Melamine), Bismalemide, epoxy resins, vinyl ester resins, Benzoxazine resins, polyesters, unsaturated polyesters, Cyanate ester resins, or mixtures thereof. Epoxy resins are particularly preferred. Curing agents and optionally accelerators may be included as desired.

The conductive fibres may be any fibre suitable for use in a composite material which is electrically conductive. A preferred fibre is carbon fibre.

Typically the fibres in the structural layer will generally have a circular or almost circular cross-section with a diameter in the range of from 3 to 20 μm, preferably from 5 to 12 μm.

It is highly desirable that particulate material be dispersed within the first, and if present second, resin layer. Upon compression the resin is forced into the interstices and filtration of the particulate material occurs such that the particulate material is pressed against the structure of the fibres, helping to disrupt its structure with some particles embedding themselves in the outer region of the fibres. For example, the resin may comprise from 5 to 20 wt % particulate material.

Thus, the majority of the particulate material ends up located in the first, and if present second, outer resin layers, e.g. at least 70 wt %.

The particulate material can be made from a wide variety of materials, however preferably they provide an additional useful function such as improved toughness or conductivity. Materials which are suitable include polyamide 6, polyamide 6/12, polyamide 12, conductive coatings on particulates formed from resins such as phenolic resins or from glass beads, coatings such as silver, carbon particles and/or microparticles and others.

Once the prepregs are produced by the process of the present invention, a plurality of them are typically stacked together, producing a prepreg stack comprising a plurality of structured layers of disrupted conductive fibres separated by resin interleaf layers formed by the first, and if present second, outer resin layers.

Typically the orientation of the fibres will vary throughout the stack, for example by arranging for the fibres in neighbouring layers to be orthogonal to each other in a so-called 0/90 arrangement, signifying the angles between neighbouring fibre layers. Other arrangements such as 0/+45/−45/90 are of course possible among many other arrangements.

The prepreg stack is then cured by exposure to elevated temperature, wherein the thermosetting resin cures. This is typically carried out under elevated pressure in known manner such as the autoclave or vacuum bag techniques.

Although disruption of the fibre layer is essential, the layered character of the resulting laminate is preserved. Thus, photographs of sections through cured laminates according to the invention show clear interleaf layers, typically from 10 to 60 micrometers thick with only a few contact points between neighbouring fibre layers.

The cured composite laminates produced according to the invention have remarkably low electrical resistance with a 3 mm thick laminate having an electrical resistance of less than 5Ω, preferably less than 2Ω, more preferably less than 1Ω being possible, as measured in the z-direction according to the test method described below. Similar composites with well ordered fibre and interleaf layers have a much greater electrical resistance.

Once formed, the interleaf layers of the cured composite laminate are typically much thinner than the structural fibre layers. Thus, the ratio of the total thickness of the structural layers to the total thickness of the interleaf layers in the cured composite laminate is from 10:1 to 3:1.

In a third aspect, the invention relates to a sheet-like prepreg comprising a structural layer of packed unidirectional conductive fibres comprising thermosetting resin in the interstices, and a first outer layer of resin comprising thermosetting resin, which when layered with at least one other such prepreg and cured under elevated temperature, produces a cured sheet-like composite material comprising cured structural layers of packed unidirectional carbon fibres having undulating upper and lower surfaces, the structural layers generally separated by an interlayer of resin, the undulations being such that points of contact exist between adjacent structural layers.

In a fourth aspect, the invention also relates to a cured sheet-like composite material comprising cured structural layers of disrupted unidirectional conductive fibres having undulating upper and lower surfaces, separated by an interlayer of resin, the undulations being such that points of contact exist between adjacent structural layers. The prepreg and composite according to the third and fourth aspects may have any of the technical features disclosed herein.

The invention will now be illustrated, with reference to the following figures, in which.

Figure 1:
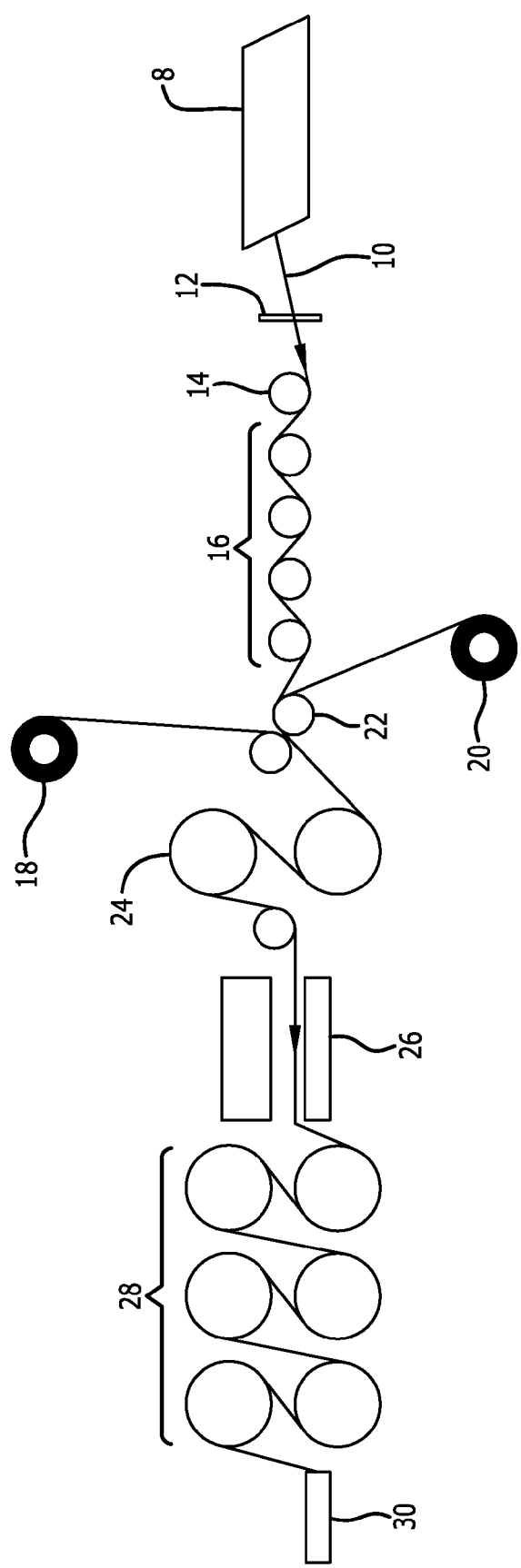
FIG. 1 is a schematic representation of a process according to the present invention.
Figure 2:
FIGS. 2 to 5 are images of sections through cured laminates produced according to the present invention.
Figure 3:
Figure 4:
Figure 5:
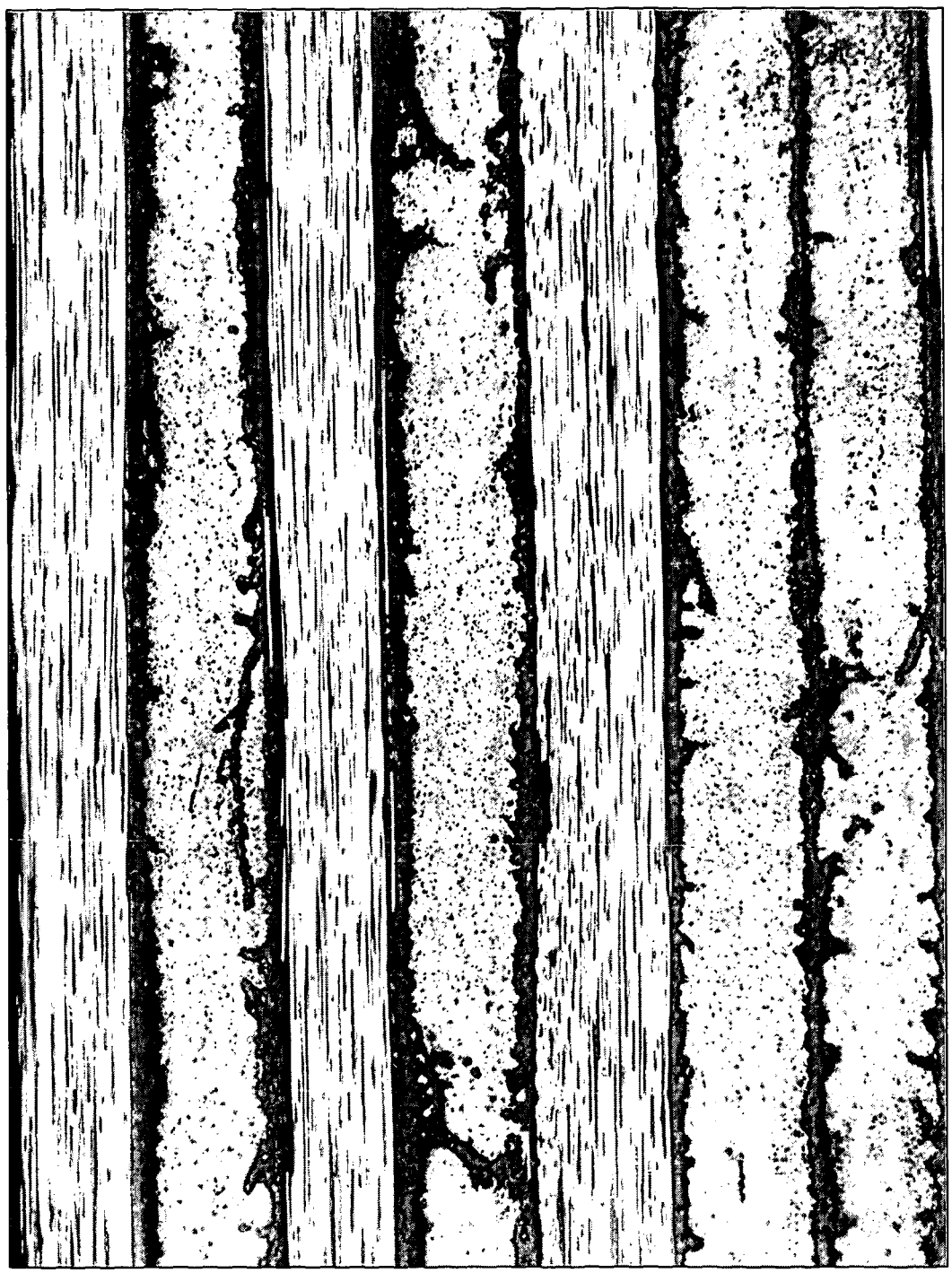

Turning to FIG. 1, the process proceeds from right to left beginning with a creel unit 8 which can support 370 spools of carbon fibre tows, each tow having 12,000 individual carbon filaments. Each fibre bobbin on the creel is tensioned by a strap and spring arrangement to control uniform tow to tow fibre tension to the machine. The tows of fibre pass from the creel to a comb. Before they enter the comb a measurement of individual tow tension is taken at location 10 in FIG. 1. Individual 12 k carbon fibre tow tensions are measured here with a hand held fibre tensiometer. Fibre brake load on the creel from the strap and spring assembly is controlled to provide a fibre tension at this point of around 160 g/tow A random selection of ten tows from each of the process web is measured for quality control and checking the nominal fibre tow tension is at the preferred individual tow tension of 160 g/tow. The fibre tows then pass through a comb 12. The fibre comb acts to separate the carbon fibre tows and align them into the fibre spreading bar section and control the overall fibre web width so that prepreg fibre areal weight is within tolerances. The fibre tows then pass onto a load cell roller 14 which measures the global overall applied tension to the carbon fibres. The fibres then pass through spreader bars 16. These bars control fibre tensioning and spreading to control the final fibre tension and alignment of fibres before they make contact with the resin coated films at the pinch point 22.

The two bars forming pinch point 22 are locked so they do not rotate, other bars before this do rotate. The first spreader bar 16 is a load cell roller to monitor overall global fibre tension incoming to the spreader bar system. The fibre tows are heated in this spreader bar section by an infra red heater (not shown) in preparation for impregnation by resin. The infra-red heater softens the fibre sizing in order to help promote good fibre impregnation. The fibre sizing is an epoxy solution that is applied to the carbon fibre at point of manufacture to aid fibre handling but can in some instances the sizing can restrict fibre spreading and impregnation.

The two pre-coated resin film rolls are loaded to the prepreg machine unwinds, one above the prepreg web 18 and one below the prepreg web 20. These film rolls provide resin that is fed by top film unwind 18 and bottom film unwind 20. The resin and fibres meet at pinch point 22. No significant impregnation occurs at this point.

Pre-coated resin films are at nominally 69 gsm for this 268 fibre areal weight product so that we achieve 34% resin content by weight in the final product. The resin is coated onto the tight side of a super calendared double sided differential value silicone release coated paper. Film roll braking tensions at unwinds 18 and 20 are controlled and matched with the final fibre web tension in order to run a crease free prepreg web through the hot S-wrap impregnation zone 24, 28.

The resin and fibres then pass through the first S-wrap compactor 24 and then through another infrared heating stage 26 for further heating. The prepreg is heated under the IR heater to 120 to 130° C. so that resin viscosity is reduced before the web enters the $2^{nd}$, $3^{rd}$ and $4^{th}$ heated S-wrap roll sets, as shown in FIG. 1, for resin impregnation into the structural fibrous layer of 12 k carbon fibre tows. At this stage of the process, after the IR heater 26, the resin has a low enough viscosity for impregnation into the fibres.

The resin and fibres pass through three more S-wrap compactors 28 where the impregnation occurs to produce disrupted fibre layers with reliable and sufficient impregnation. These S-wrap roller sets are heated to 135 to 140° C., are 270 mm diameter and are separated to form a gap between them of 350 to 450 mm.

The rotational speed on these rollers are controlled so that web wrapping forces are high in order for these forces to act of the prepreg web for disruption of the structural fibre layer and cause high resin flow into the carbon fibres for good impregnation to be achieved. The disruption of the structural fibre layer by the S-wrap wrapping forces has been found to be required for low resistance values and impregnation is needed for success in the automated prepreg tape laying operation in customer processes.

The fibre and resin then passes over a chilled plate 30. The prepreg web is chilled on this chill plate to cool the prepreg to 20 to 22° C. so that a process paper can be removed prior to further conventional processing prepreg processing stages that follow the chill plate and which are not shown here but are known to the skilled person.

EXAMPLES

Resistance of Composite Laminates Test Method

A panel is prepared by autoclave cure that is 300 mm×300 mm×3 mm in size. The layup of the panel is 0/90. Specimens (typically three to four) for test are then cut from the panel that are 36 mm×36 mm. The square faces of the specimens should be sanded (for example on a on a Linisher machine) to expose the carbon fibres. This is not necessary if peel ply is used during the cure. Excess sanding should be avoided as this will penetrate past the first ply. The square faces are then coated with an electrically conductive metal, typically a thin layer of gold via a sputterer. Any gold or metal on the sides of the specimens should be removed by sanding prior to testing. The metal coating is required to ensure low contact resistance.

A power source (TTi EL302P programmable 30V/2 A power supply unit, Thurlby Thandar Instruments, Cambridge, UK) that is capable of varying both voltage and current is used to determine the resistance. The specimen is contacted with the electrodes (tinned copper braids) of the power source and held in place using a clamp (ensure electrodes do not touch each other or contact other metallic surfaces as this will give a false result). Ensure the clamp has a non-conductive coating or layer to prevent an electrical path from one braid to the other. A current of one ampere is applied and the voltage noted. Using Ohm's Law resistance can then be calculated (V/I). The test is carried out on each of the cut specimens to give range of values. To ensure confidence in the test each specimen is tested two times.

Compression After Impact (CAI) Test Method

Compression after impact (CAI) testing at room temperature was conducted according to test protocols well known to those versed in the Art of aerospace composite testing. The specific test method followed for this work was AITM 1-0010. Compression measurements were made using a test machine calibrated to Class 1 of ISO 7500-1 and accurate to within 1% in the relevant load range. The tests were made at 23° C.+−2° C. Quasi isotropic laminates approximately 4 mm thick were prepared according to EN 2565 method B. The panels were checked by non-destructive testing (C-scan) to ensure that they were free from detectable defects prior to impacting. Samples were impacted with a hemispherical impact made of Material: steel Rm=2000 MPa according to EN 2760 or a steel of equivalent hardness. The indentor tip had a diameter: of 16±0.5 mm and a hemispherical radius: of 8±0.25 mm with a roughness: Ra<0.8 mm. Indent depths on impacted specimens were measured using a depth gauge with hemispherical adapter, diameter 3 mm and calibrated to within 0.01 mm. Depth measurements were made within 30 minutes of impacting.

Samples were impacted across a variety of energies selected so that the effect of impact energy on indent depth, delamination and residual compression strength could be determined for across samples exhibiting indent depths from at least 1 mm to significantly lower indent depths.

Delamination areas were measured using a C-scan with Olympus Omniscan equipment. After impacting and measurement the residual compression strength was determined by loading the samples to failure using a compression tool equipped with antibuckling side guides designed to minimise load transfer to the guides.

Strain gauges and suitable automatic strain recording equipment shall be employed for calibration of the compression loading tool. BVID 1 mm CAI's were determined as triplicate measurements on samples impacted at an energy determined empirically to result in an indent 1 mm deep.

Examples 1 to 6

In the examples, resin was mixed in a hot-melt process where liquid and powder components were first blended and then mixed again with further powder components that were the curing agent and toughening polyamide 6 particles at nominally 20 microns in diameter, being Orgasol, from Arkema.

The curing agent and toughening particles were mixed into the first stage blend with high shear and suitable temperature (80° C.) to allow a "flowable viscosity" for decanting the resin from the mixing vessel without overheating and risking either excessive resin advancement or exothermic reaction. This mixing step can be completed in a batch type process or in a continuous mixing process using for example a twin screw extruder for continuous mixing and feed of hot resin direct to the coating machine.

In this example when the batch mixing process was complete the fully mixed resin formulation was decanted from the mixing vessel into the coating bath on the reverse roll filming machine. The filming process was typical for hot-melt reverse roll resin coating practices. The meter roll and applicator rolls were heated to the process temperature (85° C.) and a coating gap was set between them. The line speed, coating gap and applicator roll speed were controlled to allow a coating of resin at 69 gm−2 nominal to be coated to a super calendared glassine based double sided release paper as those typically used in the industry from suppliers such as Laufenberg or Mondi. Rolls of film were made at this coat weight and then taken to the prepreg line for use. The prepreg line was set to make a prepreg where the resin type is as used in batches 1349 and 1351 of WO 2008/040963, having a viscosity of 345 Pas at 70° C. The nominal amount of resin in the prepreg is 34% by weight, and this is achieved by using two layers of the coated film with each layer at nominally 69 gm−2 so 138 gm−2 in total. The fibre areal weight grade of the prepreg is 268 gm−2 of fibre in the prepreg product. The fibre grade type is IMA (from Hexcel), with sizing type as on the IMA fibre with 12,000 nominal number of carbon filaments at ~6 microns diameter in one IMA carbon fibre tow.

The carbon fibre type IMA has a mass per unit length of nominally 0.445 gm−1. Using calculations well known in the industry 370 spools of IMA 12 k carbon fibre tow were loaded to a carbon fibre creel unit and each tow threaded into the prepreg line. This formed a carbon fibre web of ~615 mm wide and of nominally 268 gm−2. Two coated resin films were loaded to the prepreg machine such that one resin layer would be applied to the top surface of the carbon fibre web and one resin film would apply a resin layer to the bottom surface of the carbon fibre web. This is a typical one stage approach to prepreg processing.

The resin/fibre/resin layer, the "prepreg web" was routed through the prepreg line through four sequential S-wrap stages with no nip stages employed (as shown in FIG. 1), or with one S-wrap and three nip stages. The impregnation zone was heated to a temperature suitable for this resin system (120° C.) and line speed was controlled such that resin flow would be achieved during the time the prepreg web was retained within this hot impregnation zone. The nip stages were calculated to induce a pressure of 42 kg per centimeter width of the conductive fibres and so fall outside the scope of the present invention. The S-wrap stages induced a pressure of less than 30 kg per centimeter of the conductive fibres.

For comparison purposes a typical two-stage process was also employed, involving impregnating resin into the fibres without causing disruption and a second stage at a lower temperature of bringing into contact a further layer of resin which produces the interlayer during lay-up.

The prepreg process was also such that carbon fibre tow tensions (incoming tension at comb area between 120 and 160 g/tow), temperature (120° C.), pressure from S-wrap and speed (5 m/minute) were controlled to provide a prepreg with fibre wet-out (impregnation) at desired levels for porosity free thick laminate structures. The prepreg was wound onto a core with one film coating release paper retained and one coating release paper replaced by a plain polythene protective layer.

The prepreg was then used to make a 12 ply 0° 90° laminate of 300 mm×300 mm that was cured in the typical cure cycle for such a prepreg. This is 2° C./minute heat up rate to 180° C. for a 2 hour cure then cooling to ambient all under ~6 bar pressure.

This laminate was then cut to provide 8 squares at ~38 mm×38 mm. The edges of these squares of cured laminate were then smoothed on the finishing machine to give good clean and even edges and a final diameter of ~36 mm×36 mm. The square laminate samples were then measured for resistance as described below. The measurement involves a cured composite of 3 mm thick and ~36 mm×36 mm with a conductive layer (gold sputter) applied to both laminate faces. Resistance is then measured in Ohms.

Laminates were also tested for their compression after impact (CAI) properties, according to the procedure described. The results of the resistance and CAI tests are shown below in Table 1. Comparative Examples A to D fall outside the scope of the invention.

TABLE 1

| Example | Process | Resistance (Ω) | Indent depth 25J (mm) | Delam area 25J (cm²) | CAI 25J (MPa) | CAI BVID 1 mm (MPa) |
|---|---|---|---|---|---|---|
| A | Two stage | 7.0 | 0.21 | 8.1 | 289 | 214 |
| B | One stage | 0.4 to 0.7 | 0.21 | 4.61 | 291.5 | 210 |
| C | 1 × S-wrap 3 × nip | 0.1 | 0.23 0.25 | 8.82 9.69 | 232.3 283.9 | 205 209 |
| D |  | 0.1 | — | — | — | — |
| 1 | One stage | 1.63 | 0.25 | 5.90 | 261.3 | 208 |
| 2 | 3 × S-wrap | 1.82 | — | — | — | — |
| 3 |  | 1.34 | — | — | — | — |
| 4 |  | 1.66 | — | — | — | — |
| 5 |  | 1.48 | — | — | — | — |
| 6 |  | 1.45 | — | — | — | — |

It can be seen that disrupting the fibres in the prepreg, according to the present invention, gives dramatic increases in conductivity, without affecting the mechanical strength.

It should be noted that, although comparative examples B to D have very low electrical resistance, this is believed to be related to increased disruption introduced by the high pressure nip stages. However, the degree of disruption is such that the resistance values are less reproducible and the degree of resin impregnation was not within the tight tolerances required. Only examples 1 to 6 provide both good conductivity and good mechanical performance.

Examples 7 to 8

The above examples were repeated but this time with different arrangements of impregnation rollers, involving nip rollers which exert a pressure of 36 kg per centimeter width of the conductive fibres and so fall inside the scope of the present invention. The results, together with a variety of mechanical properties widely employed in the art such as Interlaminar Shear Strength, Ultimate Tensile Strength, Open Hole Tension and Compression After Impact, are shown below in Table 2.

TABLE 2

| Example | Process | Resistance (Ω) | ILSS | ILSS UD | UTS | OHT | CAI |
|---|---|---|---|---|---|---|---|
| 7 | One stage 1 × S-wrap 3 × nip | 0.8 | 65 | 96 | 3250 | 769 | 260 |

TABLE 2-continued

| Example | Process | Resistance (Ω) | ILSS | ILSS UD | UTS | OHT | CAI |
|---------|---------|----------------|------|---------|-----|-----|-----|
| 8 | One stage 3 × S-wrap 1 × nip | 1.93 | 65 | 92 | 3194 | 801 | — |

Examples 9 to 10

Example 6 was repeated but this time varying the speed of the rollers relative to the speed of the conductive fibres and resin passing over them. Such variation is referred to in the art as "trim" and can be positive (if the rollers are driven faster than the fibres, or negative (if the rollers are driven slower than the fibres).

The results are presented below in Table 3.

TABLE 3

| Example | Process | Resistance (Ω) |
|---------|---------|----------------|
| 9 | One stage 3 × S-wrap, negative trim | 1.40 |
| 10 | One stage 3 × S-wrap, 1% positive trim | 1.14 |

Example 11

Example 6 was repeated again but this time using a lower viscosity resin having a viscosity of 241 Pas at 70° C.

The results are presented below in Table 4.

TABLE 4

| Example | Process | Resistance (Ω) |
|---------|---------|----------------|
| 6 | One stage 3 × S-wrap | 1.40 |
| 11 | One stage 3 × S-wrap, low viscosity resin | 0.93 |

The invention claimed is:

1. A process for the manufacture of a prepreg comprising the steps of:
providing a fibre web comprising a plurality of tows, said tows each comprising a plurality of unidirectional carbon filaments, said fibre web having first and second faces, spaces located between said tows and interstices located within said tows between said unidirectional carbon filaments and a width;
contacting said first face of the fibre web with a first layer of resin at a pinch point to form a resin coated fibre web in which said first layer of resin does not impregnate the spaces located between said tows or said interstices, said first layer of resin comprising a first thermosetting resin;
passing said resin coated fibre web through a first S-wrap stage comprising a single pair of S-wrap rollers wherein the viscosity of said first thermosetting resin and the pressure exerted on said first layer of resin by said single pair of S-wrap rollers is sufficient to farm a partially impregnated fibre web in which said first thermosetting resin is not present in said interstices;
heating said partially impregnated fibre web a sufficient amount to reduce the viscosity of said first thermosetting resin in said partially impregnated fibre web to form a heated partially impregnated fibre web comprising a first thermosetting resin with reduced viscosity and having a temperature of between 100° C. and 130° C.; and
passing said heated partially impregnated fibre web through a second S-wrap stage comprising three pairs of S-wrap rollers, said S-wrap rollers being at a temperature that is higher than the temperature of said heated partially impregnated fibre web wherein the viscosity of said first thermosetting resin with a reduced viscosity and the pressure exerted on said first thermosetting resin with reduced viscosity by said three pairs of S-wrap rollers is sufficient to form a fully impregnated fibre web in which said first thermosetting resin with reduced viscosity is present in said interstices.

2. A process according to claim 1, which comprises the steps of:
contacting said second face of the fibre web with a second layer of resin at said pinch point to form a double resin coated fibre web in which said second layer of resin does not impregnate the spaces located between said tows or said interstices, said second layer of resin comprising a second thermosetting resin;
passing said double resin coated fibre web through a first S-wrap stage comprising a single pair of S-wrap rollers wherein the viscosity of said second thermosetting resin and the pressure exerted on said second thermosetting resin by said S-wrap rollers is sufficient to form a partially impregnated double resin coated fibre web in which said second thermosetting resin is not present in said interstices;
heating said partially impregnated double resin coated fibre web a sufficient amount to reduce the viscosity of said second thermosetting resin in said partially impregnated double resin coated fibre web to form a heated partially impregnated double resin coated fibre web comprising a second thermosetting resin with reduced viscosity and having a temperature of between 100° C. and 130° C.; and
passing said heated partially impregnated double resin coated fibre web through a second S-wrap stage comprising three pairs of S-wrap rollers, said S-wrap rollers being at a temperature that is higher than the temperature of said heated partially impregnated double resin coated fibre web wherein the viscosity of said second thermosetting resin with a reduced viscosity and the pressure exerted on said second thermosetting resin by said three pairs of S-wrap rollers is sufficient to form a fully impregnated double resin coated fibre web in which said second thermosetting resin is present in said interstices.

3. A process according to claim 1, wherein said first layer of resin is supported on backing paper having a compressibility of less than 0.001 kg$^{-1}$m$^{-2}$.

4. A process according to claim 1 wherein the carbon filaments are each under a tension of from 0.007 to 0.025 g per filament prior to contact with said first layer of resin.

5. A process according to claim 1, wherein particulate material is dispersed with said first layer of resin.

6. A process according to claim 1, wherein said first thermosetting resin has a viscosity at 70° C. of less than 300 Pascal seconds at a shear rate of 10 rad/s.

7. A process according to claim 1, wherein said fibre web is passed through said first and second S-wrap stages at a speed of passage and wherein the speed of rotation of said single pair of S-wrap rollers and said three pairs of S-wrap rollers is such that the net relative rotational speed of said single pair of S-wrap rollers and said three pairs of S-wrap rollers is greater than said speed of passage by less than 5%.

8. A process according to claim 7 wherein the rotational speed of said single pair of S-wrap rollers is 2% less than said speed of passage, the rotational speed of a first pair of said three pairs of S-wrap rollers is equal to said speed of passage, the rotational speed of a second pair of said three pairs of S-wrap rollers is 2% faster than said speed of passage and a third of pair of said three pairs of S-wrap rollers is 1% faster than said speed of passage to thereby provide a net relative rotational speed of said single pair of S-wrap rollers and said three pairs of S-wrap rollers that is greater than said speed of passage by an amount equal to 0.25%.

9. A process according to claim 1 wherein said first thermosetting resin is an epoxy resin.

10. A process according to claim 5 wherein said first thermosetting resin is an epoxy and said particulate material comprises polyamide particles.

11. A process according to claim 1 wherein each tow comprises 12,000 carbon filaments.

12. A process according to claim 1 wherein said tows include a fibre sizing which is formed by coating said tows with an epoxy solution and wherein said process comprises the step of heating said fibre web prior to said pinch point, to a temperature that is sufficient to soften said fibre sizing.

13. A process according to claim 2 wherein said second layer of resin is supported on backing paper having a compressibility of less than 0.001 kg$^{-1}$m$^{-2}$.

14. A process according to claim 2 wherein the carbon filaments are each under a tension of from 0.007 to 0.025 g per filament prior to contact with said second layer of resin.

15. A process according to claim 2 wherein particulate material is dispersed with said second layer of resin.

16. A process according to claim 2 wherein said second thermosetting resin has a viscosity at 70° C. of less than 300 Pascal seconds at a shear rate of 10 rad/s.

17. A process according to claim 16 wherein said second thermosetting resin is an epoxy resin.

18. A process according to claim 15 wherein said second thermosetting resin is an epoxy and said particulate material comprises polyamide particles.

19. A process according to claim 2 wherein each tow comprises 12,000 carbon filaments.

20. A process according to claim 2 wherein said tows include a fibre sizing which is formed by coating said tows with an epoxy solution and wherein said process comprises the step of heating said fibre web prior to said pinch point to a temperature that is sufficient to soften said fibre sizing.

* * * * *